US012748332B2

(12) United States Patent
Han

(10) Patent No.: US 12,748,332 B2
(45) Date of Patent: Sep. 29, 2026

(54) REGULATION AND CONTROL METHOD FOR ELECTROCHROMIC DEVICE AND ELECTRONIC DEVICE

(71) Applicant: GUANGYI INTELLIGENT TECH (SUZHOU) CO., LTD, Jiangsu (CN)

(72) Inventor: Zexing Han, Jiangsu (CN)

(73) Assignee: GUANGYI INTELLIGENT TECH (SUZHOU) CO., LTD, Jiangsu (CN)

( * ) Notice: Subject to any disclaimer, the term of this patent is extended or adjusted under 35 U.S.C. 154(b) by 333 days.

(21) Appl. No.: 18/348,119

(22) Filed: Jul. 6, 2023

(65) Prior Publication Data

US 2023/0350261 A1 Nov. 2, 2023

Related U.S. Application Data

(63) Continuation of application No. PCT/CN2022/070052, filed on Jan. 4, 2022.

(30) Foreign Application Priority Data

Jan. 6, 2021 (CN) ......................... 202110014346.7

(51) Int. Cl.
*G09G 3/19* (2006.01)
*G02F 1/163* (2006.01)

(52) U.S. Cl.
CPC .................................... *G02F 1/163* (2013.01)

(58) Field of Classification Search
CPC ............. G02F 1/163; G09G 3/19; G09G 3/38
See application file for complete search history.

(56) References Cited

U.S. PATENT DOCUMENTS 10,760,334 B2 9/2020 Agrawal et al.
2014/0362430 A1 12/2014 Yamamoto et al.
(Continued)

FOREIGN PATENT DOCUMENTS

CN 104364708 A 2/2015
CN 107037659 A 8/2017
CN 107770376 A 3/2018
(Continued)

OTHER PUBLICATIONS

English translation of CN104364708 prepared by Google Patents on Sep. 26, 2023 (https://patents.google.com/patent/CN104364708B/en?oq=CN104364708).
(Continued)

*Primary Examiner* — Dennis P Joseph
(74) *Attorney, Agent, or Firm* — TechLaw Ventures, PLLC; Terrence J. Edwards

(57) ABSTRACT

Provided are a regulation and control method for an electrochromic device and an electronic device. The regulation and control method for an electrochromic device includes: receiving a transmittance regulation signal of the electrochromic device, where the transmittance regulation signal carries a target gear value for transmittance of the electrochromic device; acquiring a current gear value of the electrochromic device; and determining a target voltage regulation manner according to the target gear value, the current gear value, and a stable state gear value of the electrochromic device, so as to regulate the transmittance of the electrochromic device according to the target voltage regulation manner.

20 Claims, 5 Drawing Sheets

(56) References Cited

U.S. PATENT DOCUMENTS

| | | | | |
|---|---|---|---|---|
| 2016/0026059 A1* | 1/2016 | Chung | B60R 1/088 | |
| | | | 359/275 | |
| 2020/0033686 A1* | 1/2020 | Yamamoto | E06B 3/6722 | |

FOREIGN PATENT DOCUMENTS

| | | | |
|---|---|---|---|
| CN | 107796984 | A | 3/2018 |
| CN | 107908055 | A | 4/2018 |
| CN | 105607372 | A | 9/2018 |
| CN | 108780260 | A | 11/2018 |
| CN | 109088988 | A | 12/2018 |
| CN | 110989262 | A | 4/2020 |
| CN | 111474797 | A | 7/2020 |
| CN | 112817193 | A | 5/2021 |
| JP | H09211497 | A | 8/1997 |
| JP | 2016218357 | A | 12/2016 |
| JP | 2019204079 | A | 11/2019 |
| WO | 2022148335 | A1 | 7/2022 |

OTHER PUBLICATIONS

English translation of CN105607372 prepared by Google Patents on Sep. 26, 2023 (https://patents.google.com/patent/CN105607372A/en?oq=CN105607372).
English translation of CN107770376 prepared by Google Patents on Sep. 26, 2023 (https://patents.google.com/patent/CN107770376A/en?oq=CN107770376).
English translation of CN107796984 prepared by Google Patents on Sep. 26, 2023 (https://patents.google.com/patent/CN107796984A/en?oq=CN107796984).
English translation of CN107908055 prepared by Google Patents on Sep. 26, 2023 (https://patents.google.com/patent/CN107908055A/en?oq=CN107908055).
English translation of CN108780260 prepared by Google Patents on Sep. 26, 2023 (https://patents.google.com/patent/CN108780260B/en?oq=CN108780260).
English translation of CN109088988 prepared by Google Patents on Sep. 26, 2023 (https://patents.google.com/patent/CN109088988A/en?oq=CN109088988).
English translation of CN110989262 prepared by Google Patents on Sep. 26, 2023 (https://patents.google.com/patent/CN110989262A/en?oq=CN110989262).
English translation of JP2016218357 prepared by Google Patents on Sep. 26, 2023 (https://patents.google.com/patent/JP2016218357A/en?oq=JP2016218357).
English translation of of CN107037659 prepared by Google Patents on Jan. 6, 2023 (https://patents.google.com/patent/CN107037659A/en?oq=CN107037659).
English translation of CN111474797A prepared by Google Patents on Jan. 6, 2023 (https://patents.google.com/patent/CN111474797A/en?oq=CN111474797).
English translation of CN112817193 prepared by Google Patents on Jan. 6, 2023 (https://patents.google.com/patent/CN112817193A/en?oq=CN112817193).
English translation of JP2019204079 prepared by Google Patents on Jan. 6, 2023 (https://patents.google.com/patent/JP2019204079A/en?oq=JP2019204079).
English translation of WO2022148335 prepared by Google Patents on Jan. 6, 2023 (https://patents.google.com/patent/WO2022148335A1/en?oq=WO2022148335).
International Search Report for PCT/CN2022/070052 dated Mar. 17, 2022.
English translation of CN 111474797 prepared by Google Patents.
English translation of Jp H09211497 prepared by Google Patents.

* cited by examiner

FIG. 7 -Prior art-

| | | target applied voltage value |
|---|---|---|
| colored state gears | gear 1 | -1.0 V |
| | gear 2 | -0.9 V |
| | gear 3 | -0.8 V |
| | gear 4 | -0.7 V |
| | gear 5 | -0.6 V |
| | gear 6 | -0.5 V |
| | gear 7 | -0.4 V |
| | gear 8 | -0.3 V |
| | gear 9 | -0.2 V |
| | gear 10 | -0.1 V |
| stable state gear | gear 11 | 0 V |
| decolored state gears | gear 12 | 0.1 V |
| | gear 13 | 0.2 V |
| | gear 14 | 0.3 V |
| | gear 15 | 0.4 V |
| | gear 16 | 0.5 V |
| | gear 17 | 0.6 V |
| | gear 18 | 0.7 V |
| | gear 19 | 0.8 V |
| | gear 20 | 0.9 V |
| | gear 21 | 1.0 V |

REGULATION AND CONTROL METHOD FOR ELECTROCHROMIC DEVICE AND ELECTRONIC DEVICE

CROSS-REFERENCE TO RELATED APPLICATIONS

This is a continuation of International Patent Application No. PCT/CN2022/070052, filed on Jan. 4, 2022, which claims priority to Chinese Patent Application No. 202110014346.7 filed with the China National Intellectual Property Administration (CNIPA) on Jan. 6, 2021, the disclosures of which are incorporated herein by reference in their entireties.

TECHNICAL FIELD

The present application relates to the field of electrochromic technologies, for example, a regulation and control method for an electrochromic device and an electronic device.

BACKGROUND

An electrochromic device can respond to an applied external potential difference to change the optical performance of the electrochromic device. The change of the optical performance is mainly caused by the ion insertion or desorption of an electrochromic material in the electrochromic device.

The electrochromic device in the related art typically switches the optical performance between a colored state and a decolored state. For example, during the application, the electrochromic device may be integrated into a window to form an electrochromic window. When strong ambient light exists, a user may switch the optical state of the window to the colored state, thereby weakening the light ray intensity to a certain extent, and improving body comfort. When the ambient light intensity is relatively weak, the user may switch the optical state of the window to the decolored state, thereby increasing the ratio of incident light intensity and increasing indoor brightness. The structure of the electrochromic device is illustrated in FIG. 7, with reference to FIG. 1A in the U.S. patent document US 2020/0033686 A1. As illustrated in FIG. 7, the electrochromic device includes an electrochromic element 1, a first transparent substrate 2 and a second transparent substrate 6, a first transparent electrode 3 and a second transparent electrode 5, a spacer 4, an electrochromic layer 7, a first low-resistance wiring 8*a* and a second low-resistance wiring 8*b*, an effective optical area 9, a voltage supply unit 11, and a first power supply terminal A1 and a second power supply terminal C1.

However, in the related art, with regard to the process of switching the transmittance of the electrochromic device, only two or three adjustable gears generally exist. That is, the gears include a colored-state gear and a decolored-state gear, or include a colored-state gear, a decolored-state gear, and an intermediate state gear, and the corresponding regulation method is single. In general, a corresponding voltage is directly applied to the electrochromic device so as to adjust the electrochromic device to have the corresponding transmittance. As the changing degree of the transmittance increases, the regulation rate of the transmittance is relatively slow such that the electrochromic device cannot adapt to application requirements in different scenarios, greatly reducing the user experience.

SUMMARY

The present application provides a regulation and control method for an electrochromic device and an electronic device, so as to avoid the case that the transmittance regulation method of the electrochromic device is single, the user experience is single, and the application requirements in different scenarios cannot be adapted.

The present application provides a regulation and control method for an electrochromic device, comprising:

- receiving a transmittance regulation signal of the electrochromic device, wherein the transmittance regulation signal carries a target gear value for transmittance of the electrochromic device;
- acquiring a current gear value of the electrochromic device; and
- determining, according to the target gear value, the current gear value, and a stable state gear value of the electrochromic device, a target voltage regulation manner to regulate the transmittance of the electrochromic device according to the target voltage regulation manner.

The present application further provides an electronic device. The electronic device includes a processor and a memory, the memory is coupled to the processor, and the memory is configured to store a computer program code, wherein the computer program code comprises computer instructions which, when executed by the processor, cause the electronic device to perform the preceding regulation and control method for an electrochromic device.

The present application further provides a computer-readable storage medium including computer instructions which, when executed on an electronic device, cause the electronic device to perform the regulation and control method for an electrochromic device.

BRIEF DESCRIPTION OF DRAWINGS

FIG. 7 illustrates a structural diagram of an electrochromic device.

DETAILED DESCRIPTION

Figure 1:
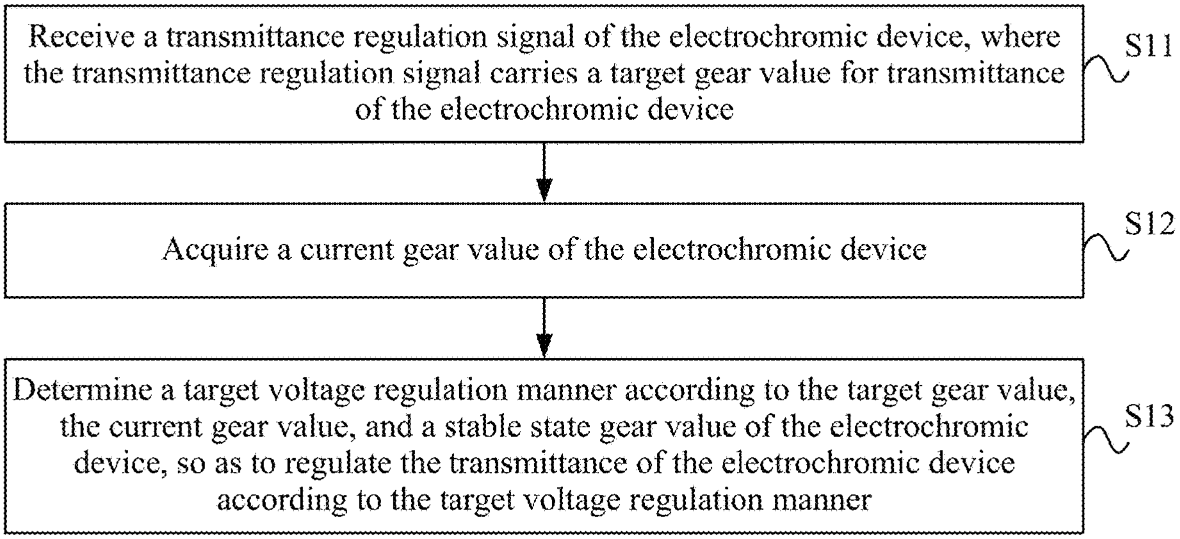
FIG. 1 is a flowchart of a regulation and control method for an electrochromic device according to an embodiment of the present application.

The present application is described below in conjunction with drawings and embodiments. Specific embodiments described herein are merely intended to explain the present application. For ease of description, only parts related to the present application are illustrated in the drawings.

Before the example embodiments are discussed, it is to be noted that some of the example embodiments are described as processing or methods depicted in flowcharts. Although multiple steps are described as sequential processing in the flowcharts, many of the steps may be implemented concurrently, coincidentally, or simultaneously. Additionally, the sequence of the multiple steps may be rearranged. The processing may be terminated when the operations are completed, but the processing may further have additional steps that are not included in the drawings. The processing may correspond to a method, a function, a procedure, a subroutine, a subprogram, or the like.

A regulation and control method for an electrochromic device provided in embodiments of the present application may be performed by a processor configured in an electronic device. The electronic device may be the electrochromic device itself, or may be a device integrated with the electrochromic device, or may be a device structurally separated from the electrochromic device and configured to control the electrochromic device. For ease of explanation, the case where the electronic device is the electrochromic device itself is used as an example for the description in the embodiments below. The electronic device in the embodiments below may be implemented in another type of electronic device.

FIG. 1 is a flowchart of a regulation and control method for an electrochromic device according to an embodiment of the present application. This embodiment is applicable to the case where transmittance of the electrochromic device is regulated and controlled in multiple stages according to the requirement of a user, and the method may be performed by a processor provided in the electrochromic device. As shown in FIG. 1, the method includes the steps described below.

In S11, receiving a transmittance regulation signal of the electrochromic device, and the transmittance regulation signal carries a target gear value for transmittance of the electrochromic device.

The transmittance of the electrochromic device may be set to multiple gears in the changing order. When the electrochromic device is in one gear, the electrochromic device may keep the corresponding transmittance. The multiple gears may be set according to the type of the electrochromic device. Each electrochromic device includes a stable state, that is, the state corresponding to an open circuit voltage (open circuit voltage, OCV) of 0 V of the electrochromic device. Based on the stable state, if the transmittance increases, the electrochromic device enters the decolored state, and if the transmittance decreases, the electrochromic device enters the colored state. When the stable state corresponds to the colored state with the lowest transmittance or the decolored state with the highest transmittance, that is, the electrochromic device has only one of the colored state or the decolored state, the multiple gears may be set to a stable state gear and at least one colored state gear or a stable state gear and at least one decolored state gear. When the stable state is located at the intermediate position between the colored state and the decolored state, the multiple gears may be set to at least one colored state gear, the stable state gear, and at least one decolored state gear. For example, multiple colored state gears and multiple decolored state gears are provided, so as to provide more possible transmittance changes, thereby improving the user experience. The regulation and control method for an electrochromic device provided in the embodiments of the present application may be applied to different types of electrochromic devices.

During the use of the electrochromic device, the user may trigger the generation of a transmittance regulation signal through an operation according to the requirement for the transmittance of the electrochromic device. For example, buttons corresponding to the multiple gears are provided outside the electrochromic device. When the user presses a button, the transmittance regulation signal may be generated, and the transmittance regulation signal carries the target gear value corresponding to the button. At this time, the processor of the electrochromic device may receive the transmittance regulation signal. The electrochromic device may also spontaneously generate the transmittance regulation signal according to the surrounding environment. For example, the electrochromic device may collect ambient brightness at a certain period and automatically generate the transmittance regulation signal according to the required transmittance corresponding to the ambient brightness, where the transmittance regulation signal also includes the target gear value corresponding to the required transmittance, and the generated transmittance regulation signal may be directly sent to the processor for processing. The method for generating the transmittance regulation signal is not limited in this embodiment and not limited to the preceding example.

In S12, acquiring a current gear value of the electrochromic device.

The current gear value may be known from the current open circuit voltage of the electrochromic device. Within the normal use range of the electrochromic device, the electrochromic device may keep at different transmittances corresponding to different open circuit voltages, that is, a one-to-one correspondence exists between the open circuit voltage and the transmittance. When the current open circuit voltage of the electrochromic device is detected, the corresponding current transmittance may be found according to the correspondence, so as to determine the corresponding current gear value according to the gear set for the transmittance.

In S13, determining, according to the target gear value, the current gear value, and a stable state gear value of the electrochromic device, a target voltage regulation manner to regulate the transmittance of the electrochromic device according to the target voltage regulation manner.

The transmittance may be regulated by applying a required voltage to the electrochromic device, and a process of determining the target voltage regulation manner may include determining an applied voltage value, a cut-off condition for the applied voltage, and so on. A positive applied voltage represents positive charging of the electrochromic device and a negative applied voltage represents reverse discharging of the electrochromic device. The need for charging or discharging may be determined according to the properties of the electrochromic material used in the electrochromic device and a regulation direction. After the target gear value and the current gear value of the electrochromic device are determined, a regulation process of the transmittance may be classified according to the relationship among the target gear value, the current gear value, and the stable state gear value, and the required target voltage regulation manner is determined according to a classification result. For example, in the case where the electrochromic device only has the colored state or the decolored state, the regulation process of the transmittance may include the following: The target gear value is the same as the current gear value; the target gear value is the same as the stable state gear value; the target gear value and the current gear value are located on the same side of the stable state gear value and the target gear value is closer to the stable state gear value; the target gear value and the current gear value are located on the same side of the stable state gear value and the target gear value is farther away from the stable state gear value, and the like. In the case where the stable state is located at the intermediate position between the colored state and the decolored state, the regulation process of the transmittance may further include that the target gear value and the current gear value are located on the opposite sides of the stable state gear value.

Requirements for the voltage regulation manner are different in different regulation processes of the transmittance. For example, when the difference between the target gear value and the current gear value is relatively small, a target applied voltage value corresponding to the target gear value may be directly applied to the electrochromic device, so as to avoid the over-regulation and make the end-point regulation accurate. When the difference between the target gear value and the current gear value is relatively large, an applied voltage value farther away from the voltage value corresponding to the current gear value than the voltage value corresponding to the target gear value may be applied to the electrochromic device, so as to improve the regulation efficiency. During the regulation, the gear change of the electrochromic device may be monitored in real time and the voltage value for charging is regulated in time, so as to achieve a better result. At the same time, the same or different cut-off conditions may be used for different regulation processes of the transmittance, where the cut-off conditions may include one or a combination of at least two of the current of the electrochromic device being less than a preset current, a charging duration reaching a preset duration, or a charge amount reaching a preset charge. After the target voltage regulation manner is determined, the transmittance of the electrochromic device may be adjusted to the transmittance state corresponding to the target gear value according to the target voltage regulation manner, so as to satisfy the requirement of the user.

In the technical scheme provided in the embodiments of the present application, the transmittance regulation signal of the electrochromic device is received first, the target gear value for the transmittance of the electrochromic device is acquired from the transmittance regulation signal, the current gear value of the electrochromic device is acquired, and then the required target voltage regulation manner is determined according to the target gear value, the current gear value, and the stable state gear value of the electrochromic device so that the transmittance of the electrochromic device may be adjusted to the required state according to the target voltage regulation manner. Different regulation manners are selected for different degrees of regulation processes of the transmittance of the electrochromic device so that the electrochromic device is regulated and controlled in multiple stages, the applied regulation manner is more suitable for application requirements of the corresponding scenario, and the regulation process is more rapid and accurate, thereby greatly improving the user experience.

Figure 2:
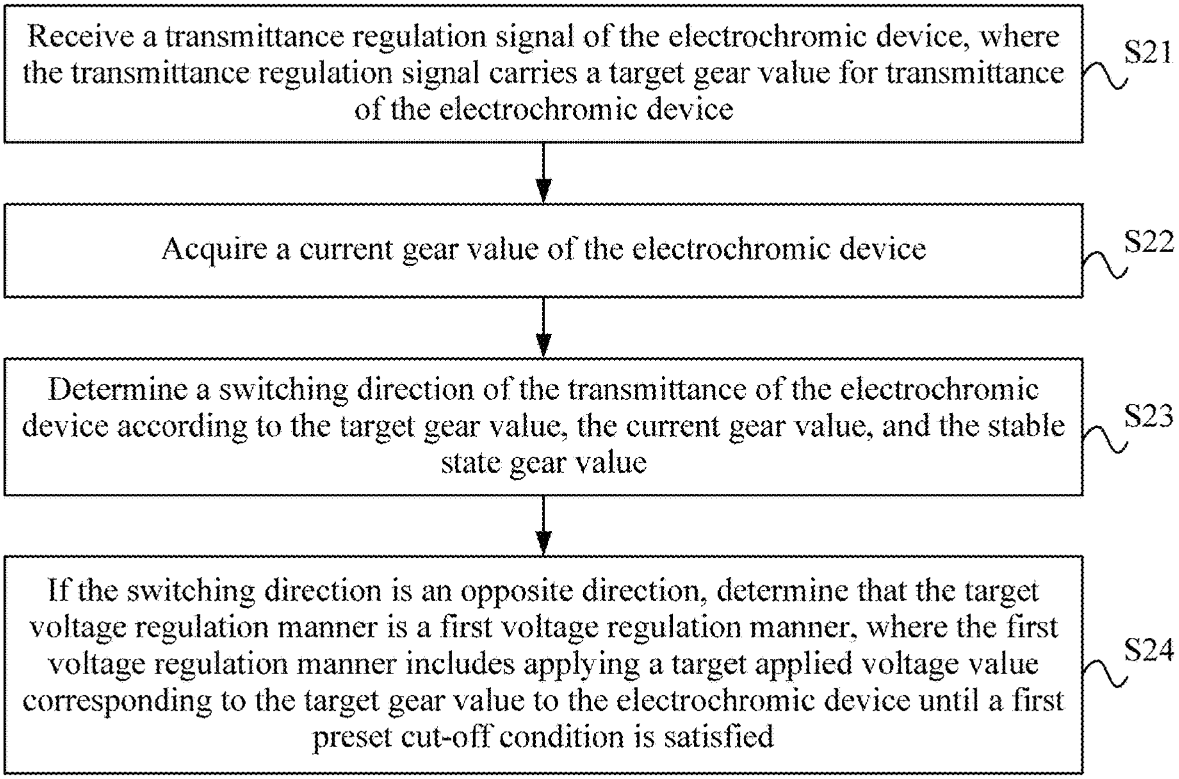
FIG. 2 is a flowchart of a regulation and control method for an electrochromic device according to another embodiment of the present application.

FIG. 2 is a flowchart of a regulation and control method for an electrochromic device according to another embodiment of the present application. The technical scheme in this embodiment is described based on the preceding technical scheme. In an embodiment, the regulation process of the transmittance may be classified according to a switching direction of the transmittance, and then the target voltage regulation manner is determined according to a classification result. In this embodiment, determining the target voltage regulation manner according to the target gear value, the current gear value, and the stable state gear value of the electrochromic device includes determining a switching direction of the transmittance of the electrochromic device according to the target gear value, the current gear value, and the stable state gear value; and in response to the switching direction being an opposite direction, determining that the target voltage regulation manner is a first voltage regulation manner. The first voltage regulation manner includes applying a target applied voltage value corresponding to the target gear value to the electrochromic device until a first preset cut-off condition is satisfied. Correspondingly, as shown in FIG. 2, the method may include the steps described below.

In S21, receiving a transmittance regulation signal of the electrochromic device, and the transmittance regulation signal carries a target gear value for transmittance of the electrochromic device.

In S22, acquiring a current gear value of the electrochromic device.

In S23, determining a switching direction of the transmittance of the electrochromic device according to the target gear value, the current gear value, and the stable state gear value.

If the target gear value and the current gear value are located on the same side of the stable state gear value, the switching direction of the transmittance is determined to be the same direction. If the target gear value and the current gear value are located on the opposite sides of the stable state gear value, the switching direction of the transmittance is determined to be the opposite direction. As in the preceding embodiment, in the case where the electrochromic device has only one of the colored state or the decolored state, only the case where the transmittance is switched in the same direction exists; and in the case where the stable state of the electrochromic device is located at the intermediate position between the colored state and the decolored state, the transmittance may be switched in the same direction or in the opposite direction. However, regardless of the type of the electrochromic device, it is feasible to first determine the switching direction of the transmittance according to the target gear value, the current gear value, and the stable state gear value in the regulation process, so as to improve the versatility of the method.

In S24, if the switching direction is the opposite direction, determining that the target voltage regulation manner is a first voltage regulation manner. The first voltage regulation manner includes applying a target applied voltage value corresponding to the target gear value to the electrochromic device until a first preset cut-off condition is satisfied.

If the switching direction of the transmittance is the opposite direction, the target applied voltage value corresponding to the target gear value may be directly applied to the electrochromic device so that the end-point regulation is accurate and the over-regulation does not easily occur. The first preset cut-off condition may be one or a combination of at least two of the current of the electrochromic device being less than a first preset current, the charging duration reaching a first preset duration, or the charge amount reaching a first preset charge.

Alternatively, before the target applied voltage value corresponding to the target gear value is applied to the electrochromic device until the first preset cut-off condition is satisfied, the first voltage regulation manner may further include the following: determining a first difference between the target gear value and the current gear value; comparing the first difference with a first preset gear difference; and if the first difference is greater than the first preset gear difference, applying a maximum applied voltage value corresponding to the target gear value to the electrochromic device, monitoring the first difference in real time, and when the first difference monitored in real time changes to be less than or equal to the first preset gear difference, performing the step of applying the target applied voltage value to the electrochromic device until the first preset cut-off condition is satisfied.

If the switching direction of the transmittance is the opposite direction, whether the difference between the target gear value and the current gear value is relatively large is determined first, that is, the first difference is compared with the first preset gear difference. If the first difference is less than or equal to the first preset gear difference, it represents that the difference is relatively small. In this case, the target applied voltage value is applied to the electrochromic device so that the electrochromic device can be quickly adjusted to the transmittance state corresponding to the target gear value, the end-point regulation is accurate, and the over-regulation does not easily occur. If the first difference is greater than the first preset gear difference, it represents that the difference is relatively large. In this case, if the target applied voltage value is applied to the electrochromic device, the regulation speed is relatively slow, resulting in a bad user experience for the electrochromic device having a relatively large dimension. Therefore, in this case, the maximum applied voltage value corresponding to the target gear value may be used to charge the electrochromic device, so as to accelerate the regulation speed of the transmittance. The maximum applied voltage value corresponds to a gear farthest from the stable state gear value in the same direction as the target gear value. At the same time, since the over-regulation occurs easily when the maximum applied voltage value is used for charging, the change of the first difference may be monitored in real time when the voltage is applied. When the first difference changes to be less than or equal to the first preset gear difference, the step of using the target applied voltage value for charging until the first preset cut-off condition is satisfied is performed, thereby ensuring the regulation accuracy on the basis of improving the regulation efficiency.

Figure 8:
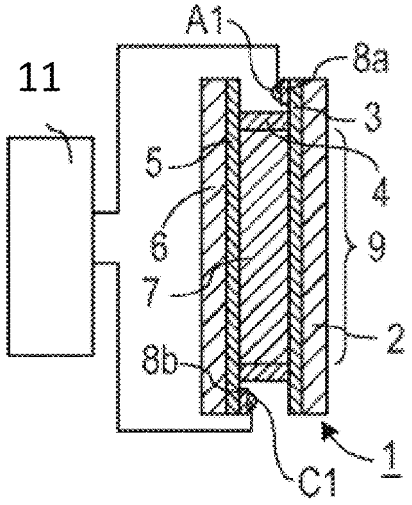
FIG. 8 illustrates a set of gears according to an embodiment of the present application.

For example, the transmittance of the electrochromic device, as shown in FIG. 8, has 21 gears, in which gear 11 is the stable state gear, gears 1 to 10 are the colored state gears, and gears 12 to 21 are the decolored state gears. If the target gear value is 19, the corresponding target applied voltage value is 0.8 V, the corresponding maximum applied voltage value is 1.0 V, the current gear value is 6, and the first preset gear difference is 5, the switching direction of the transmittance is the opposite direction and the first difference is 13 which is greater than the first preset gear difference of 5. The maximum applied voltage value of 1.0 V is applied to the electrochromic device first, and the current open circuit voltage of the electrochromic device is monitored in real time so as to determine the corresponding current gear value and determine in real time whether the first difference is less than or equal to the first preset gear difference of 5. When the first difference is less than or equal to the first preset gear difference of 5, the target applied voltage value of 0.8 V is applied to the electrochromic device until the current of the electrochromic device is less than the first preset current, and in this case, the charging is stopped.

On the other hand, if the switching direction of the transmittance is the same direction, the transmittance of the electrochromic device may be adjusted in any feasible manner, which is not limited in this embodiment. When the target gear value is the stable state gear value, the electrochromic device may be directly short-circuited until a short-circuit duration reaches a preset short-circuit duration, and the stable state gear may be directly achieved by shorting the positive and negative electrodes of the electrochromic device so that the regulation process is more rapid and simple.

In the technical scheme provided in the embodiments of the present application, the switching direction of the transmittance of the electrochromic device is determined; when the switching direction is determined to be the opposite direction, the target applied voltage value is applied to the electrochromic device; when the difference between the target gear value and the current gear value is relatively large, the maximum applied voltage value is applied to the electrochromic device, and the current open circuit voltage of the electrochromic device is monitored in real time; and when the difference between the target gear value and the current gear value changes to be relatively small, the target applied voltage value is applied to the electrochromic device so that on the basis of ensuring the accuracy of the end-point regulation, the regulation efficiency can be improved, thereby quickly achieving the requirements of the user.

Figure 3:
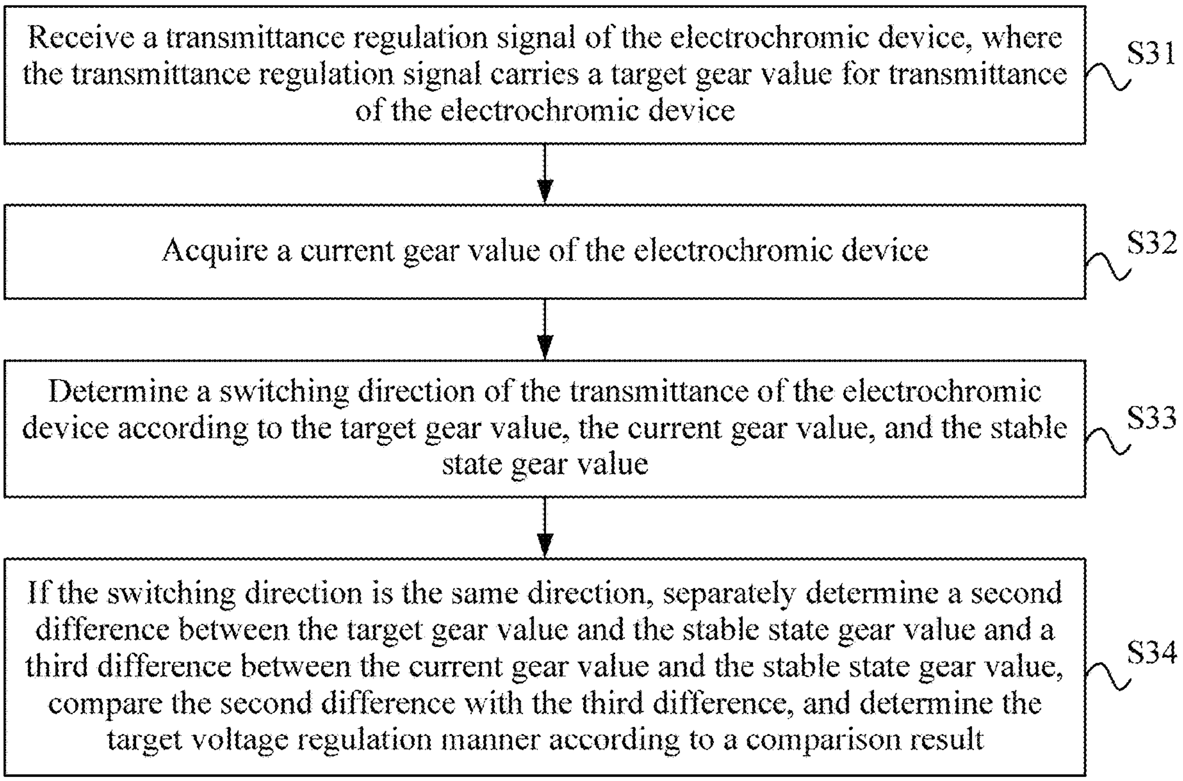
FIG. 3 is a flowchart of a regulation and control method for an electrochromic device according to another embodiment of the present application.

FIG. 3 is a flowchart of a regulation and control method for an electrochromic device according to another embodiment of the present application. The technical scheme in this embodiment is described based on the preceding technical schemes. In this embodiment, determining the target voltage regulation manner according to the target gear value, the current gear value, and the stable state gear value of the electrochromic device includes the following: A switching direction of the transmittance of the electrochromic device is determined according to the target gear value, the current gear value, and the stable state gear value; and if the switching direction is the same direction, a second difference between the target gear value and the stable state gear value and a third difference between the current gear value and the stable state gear value are respectively determined, the second difference is compared with the third difference, and the target voltage regulation manner is determined according to a comparison result. Correspondingly, as shown in FIG. 3, the method may include the steps described below.

In S31, receiving a transmittance regulation signal of the electrochromic device, and the transmittance regulation signal carries a target gear value for transmittance of the electrochromic device.

In S32, acquiring a current gear value of the electrochromic device.

In S33, determining a switching direction of the transmittance of the electrochromic device according to the target gear value, the current gear value, and the stable state gear value.

In S34, if the switching direction is the same direction, respectively determining a second difference between the target gear value and the stable state gear value and a third difference between the current gear value and the stable state gear value, comparing the second difference with the third difference, and determining the target voltage regulation manner according to a comparison result.

If the switching direction of the transmittance is the same direction, whether the target gear value is closer to the stable state gear value than the current gear value may be determined by comparing the second difference with the third difference, and then a more suitable target voltage regulation manner is determined according to the comparison result. For example, if the target gear value is closer to the stable state gear value, any voltage value in the opposite direction of the target applied voltage value may be applied to the electrochromic device, so as to increase the regulation speed. If the target gear value is farther away from the stable state gear value, any voltage value greater than the target applied voltage value may be applied to the electrochromic device, so as to increase the regulation speed.

The step of comparing the second difference with the third difference and determining the target voltage regulation manner according to the comparison result includes, if the second difference is less than the third difference, determining that the target voltage regulation manner is a second voltage regulation manner. The second voltage regulation manner includes short-circuiting the electrochromic device until an open circuit voltage of the electrochromic device is within a range between a target applied voltage value corresponding to the target gear value and a stable state voltage value corresponding to the stable state gear value, and applying the target applied voltage value to the electrochromic device until a second preset cut-off condition is satisfied.

If the second difference is less than the third difference, it is determined that the target gear value is closer to the stable state gear value, and in this case, the transmittance may be quickly and conveniently adjusted in the direction facing the stable state gear value by short-circuiting the electrochromic device. In comparison, a voltage value in the opposite direction of the target applied voltage value is used for charging, and the transmittance is easily adjusted to a gear in the opposite direction in a short time (that is, if the target gear value corresponds to the colored state gear, the transmittance is easily adjusted to a decolored state gear), thereby increasing the control difficulty and increasing the time required to readjust an over-regulation result. In contrast, it is easier to control in the short-circuiting manner, and the degree of over-regulation is reduced. However, the short-circuiting manner may also cause a certain degree of over-regulation. Therefore, after the current open circuit voltage of the electrochromic device reaches the target applied voltage value in the short-circuiting manner, the target applied voltage value may further be used for back-charging the electrochromic device until the second preset cut-off condition is satisfied, thereby ensuring the regulation accuracy on the basis of improving the regulation efficiency. The second preset cut-off condition may be one or a combination of at least two of the current of the electrochromic device being less than a second preset current, the charging duration reaching a second preset duration, or the charge amount reaching a second preset charge, and the second preset cut-off condition may be the same as the first preset cut-off condition.

For example, the transmittance of the electrochromic device has 21 gears, in which gear 11 is the stable state gear, gears 1 to 10 are the colored state gears, and gears 12 to 21 are the decolored state gears. If the target gear value is 14, the corresponding target charging voltage value is 0.3 V, and the current gear value is 18, the second difference is 3, the third difference is 7, and it is determined that the target gear value is closer to the stable state gear value. The electrochromic device is short-circuited first, and the current open circuit voltage of the electrochromic device is monitored in real time so as to determine whether the current open circuit voltage reaches the target applied voltage value. When the current open circuit voltage reaches the target applied voltage value, the voltage of 0.3 V is used to be applied to the electrochromic device until the current of the electrochromic device is less than the second preset current, and in this case, the charging is stopped.

Alternatively, the step of comparing the second difference with the third difference and determining the target voltage regulation manner according to the comparison result includes, if the second difference is greater than the third difference, determining that the target voltage regulation manner is a third voltage regulation manner. The third voltage regulation manner includes applying a target applied voltage value corresponding to the target gear value to the electrochromic device until a third preset cut-off condition is satisfied.

If the second difference is greater than the third difference, it is determined that the target gear value is farther away from the stable state gear value. In this case, the target applied voltage value corresponding to the target gear value may be directly applied to the electrochromic device so that the end-point regulation is accurate and the over-regulation does not easily occur. The third preset cut-off condition may be one or a combination of at least two of the current of the electrochromic device being less than a third preset current, the charging duration reaching a third preset duration, or the charge amount reaching a third preset charge, and the third preset cut-off condition may be the same as the first preset cut-off condition or the second preset cut-off condition.

Alternatively, before the target applied voltage value corresponding to the target gear value is applied to the electrochromic device until the third preset cut-off condition is satisfied, the third voltage regulation manner further includes the following: determining a fourth difference between the target gear value and the current gear value; comparing the fourth difference with a second preset gear difference; and if the fourth difference is greater than the second preset gear difference, applying a maximum applied voltage value corresponding to the target gear value to the electrochromic device, monitoring the fourth difference in real time, and when the fourth difference monitored in real time changes to be less than or equal to the second preset gear difference, performing the step of applying the target applied voltage value to the electrochromic device until the third preset cut-off condition is satisfied.

If it is determined that the target gear value is farther away from the stable state gear value, whether the difference between the target gear value and the current gear value is relatively large is determined first, that is, the fourth difference is compared with the second preset gear difference, where the second preset gear difference may be the same as the first preset gear difference. If the fourth difference is less than or equal to the second preset gear difference, it represents that the difference is relatively small. In this case, the target applied voltage value is applied to the electrochromic device so that the electrochromic device can be quickly adjusted to the transmittance state corresponding to the target gear value, the end-point regulation is accurate, and the over-regulation does not easily occur. If the fourth difference is greater than the second preset gear difference, it represents that the difference is relatively large. In this case, if the target applied voltage value is applied to the electrochromic device, the regulation speed is relatively slow, resulting in a bad user experience for the electrochromic device having a relatively large dimension. Therefore, in this case, the maximum applied voltage value corresponding to the target gear value may be applied to the electrochromic device, so as to accelerate the regulation speed of the transmittance. The maximum applied voltage value corresponds to a gear farthest from the stable state gear value in the same direction as the target gear value. At the same time, since the over-regulation occurs easily when the maximum applied voltage value is used to be applied to the electrochromic device, the change of the fourth difference may be monitored in real time when the voltage is applied. When the fourth difference changes to be less than or equal to the second preset gear difference, the step of using the target applied voltage value to be applied to the electrochromic device until the third preset cut-off condition is satisfied is performed, thereby ensuring the regulation accuracy on the basis of improving the regulation efficiency.

For example, the transmittance of the electrochromic device, as shown in FIG. 8, has 21 gears, in which gear 11 is the stable state gear, gears 1 to 10 are the colored state gears, and gears 12 to 21 are the decolored state gears. If the target gear value is 4, the corresponding target applied voltage value is −0.7 V, the corresponding maximum applied voltage value is −1.0 V, the current gear value is 10, and the second preset gear difference is 5, the second difference is 7, the third difference is 1, it is determined that the target gear value is farther away from the stable state gear value, and the fourth difference is 7 which is greater than the second preset gear difference of 5. The maximum applied voltage value of −1.0 V is applied to the electrochromic device first, and the current open circuit voltage of the electrochromic device is monitored in real time so as to determine the corresponding current gear value and further determine whether the fourth difference is less than or equal to the second preset gear difference of 5 in real time. When the fourth difference is less than or equal to the second preset gear difference of 5, the target applied voltage value of −0.7 V is used to be applied to the electrochromic device until the current of the electrochromic device is less than the third preset current, and in this case, the charging is stopped.

On the other hand, if the switching direction of the transmittance is the opposite direction, the transmittance of the electrochromic device may be regulated in any feasible manner including the regulation and control method in the preceding embodiments, which is not limited in this embodiment. When the target gear value is the stable state gear value, the electrochromic device may be directly short-circuited until the short-circuit duration reaches a preset short-circuit duration, and the stable state gear may be directly achieved by shorting the positive and negative electrodes of the electrochromic device so that the regulation process is more rapid and simple. When the second difference is the same as the third difference, that is, the target gear value is the same as the current gear value, the current transmittance of the electrochromic device is kept and not adjusted.

In the technical scheme provided in the embodiments of the present application, the switching direction of the transmittance of the electrochromic device is determined; when it is determined that the switching direction is the same direction, whether the target gear value is closer to the stable state gear value is determined through comparison, and the corresponding target voltage regulation manner is determined according to the comparison result; when the target gear value is closer to the stable state gear value, the transmittance is regulated in the short-circuiting manner; after the current open circuit voltage reaches the target applied voltage value, the target applied voltage value is used for back-charging; when the target gear value is farther away from the stable state gear value, the maximum applied voltage value is applied to the electrochromic device; and when the difference between the target gear value and the current gear value changes to be relatively small, the target applied voltage value is used to be applied to the electrochromic device so that, on the basis of ensuring the accuracy of the end-point regulation, the regulation efficiency can be improved, thereby quickly achieving the requirement of the user.

Figure 4:
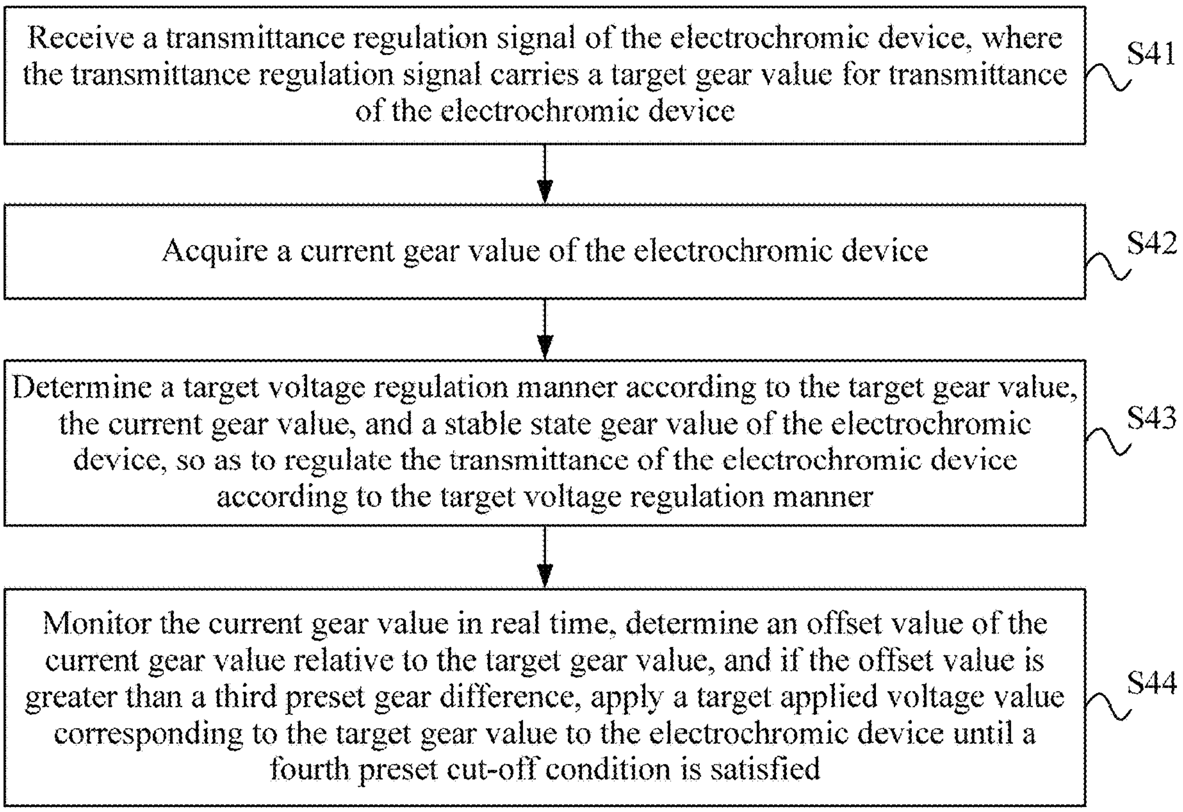
FIG. 4 is a flowchart of a regulation and control method for an electrochromic device according to another embodiment of the present application.

FIG. 4 is a flowchart of a regulation and control method for an electrochromic device according to another embodiment of the present application. The technical scheme in this embodiment is described based on the preceding technical schemes. Alternatively, after the regulation process of the transmittance of the electrochromic device, the current transmittance may be kept through a measure, so as to avoid a poor user experience due to a change in the transmittance. In this embodiment, after the target voltage regulation manner is determined according to the target gear value, the current gear value, and the stable state gear value of the electrochromic device, so as to regulate the transmittance of the electrochromic device according to the target voltage regulation manner, the method further includes the following: The current gear value is monitored in real time, an offset value of the current gear value relative to the target gear value is determined, and if the offset value is greater than a third preset gear difference, a target applied voltage value corresponding to the target gear value is applied to the electrochromic device until a fourth preset cut-off condition is satisfied. Correspondingly, as shown in FIG. 4, the method may include the steps described below.

In S41, receiving a transmittance regulation signal of the electrochromic device, and the transmittance regulation signal carries a target gear value for transmittance of the electrochromic device.

In S42, acquiring a current gear value of the electrochromic device.

In S43, determining, according to the target gear value, the current gear value, and a stable state gear value of the electrochromic device, a target voltage regulation manner to regulate the transmittance of the electrochromic device according to the target voltage regulation manner.

In S44, monitoring the current gear value in real time, determining an offset value of the current gear value relative to the target gear value, and if the offset value is greater than a third preset gear difference, applying a target applied voltage value corresponding to the target gear value to the electrochromic device until a fourth preset cut-off condition is satisfied.

After the regulation process of the transmittance of the electrochromic device, if an external power supply is directly removed, the transmittance of the electrochromic device is slowly changed toward the stable state gear. Therefore, when the target gear value is different from the stable state gear value, a transmittance-keeping process needs to start after the regulation process of the transmittance. The current gear value is monitored in real time first and may be determined by monitoring the current open circuit voltage of the electrochromic device in real time, and then the offset value of the current gear value relative to the target gear value is determined in real time. If the offset value is greater than the third preset gear difference, the offset of the current gear value is determined to be relatively large, and the transmittance of the electrochromic device requires to be readjusted. In this case, the target applied voltage value corresponding to the target gear value may be directly applied to the electrochromic device until the fourth preset cut-off condition is satisfied. The fourth preset cut-off condition may be one or a combination of at least two of the current of the electrochromic device being less than a fourth preset current, the charging duration reaching a fourth preset duration, or the charge amount reaching a fourth preset charge, and the third preset gear difference may be set according to the degree of change of the transmittance between gears, so as to avoid a relatively large change in the transmittance.

In the technical scheme provided in the embodiments of the present application, the transmittance-keeping process is added after the regulation process of the transmittance of the electrochromic device so that it is ensured that the transmittance of the electrochromic device can be more stably kept in a state required by the user, thereby improving the user experience.

Figure 5:
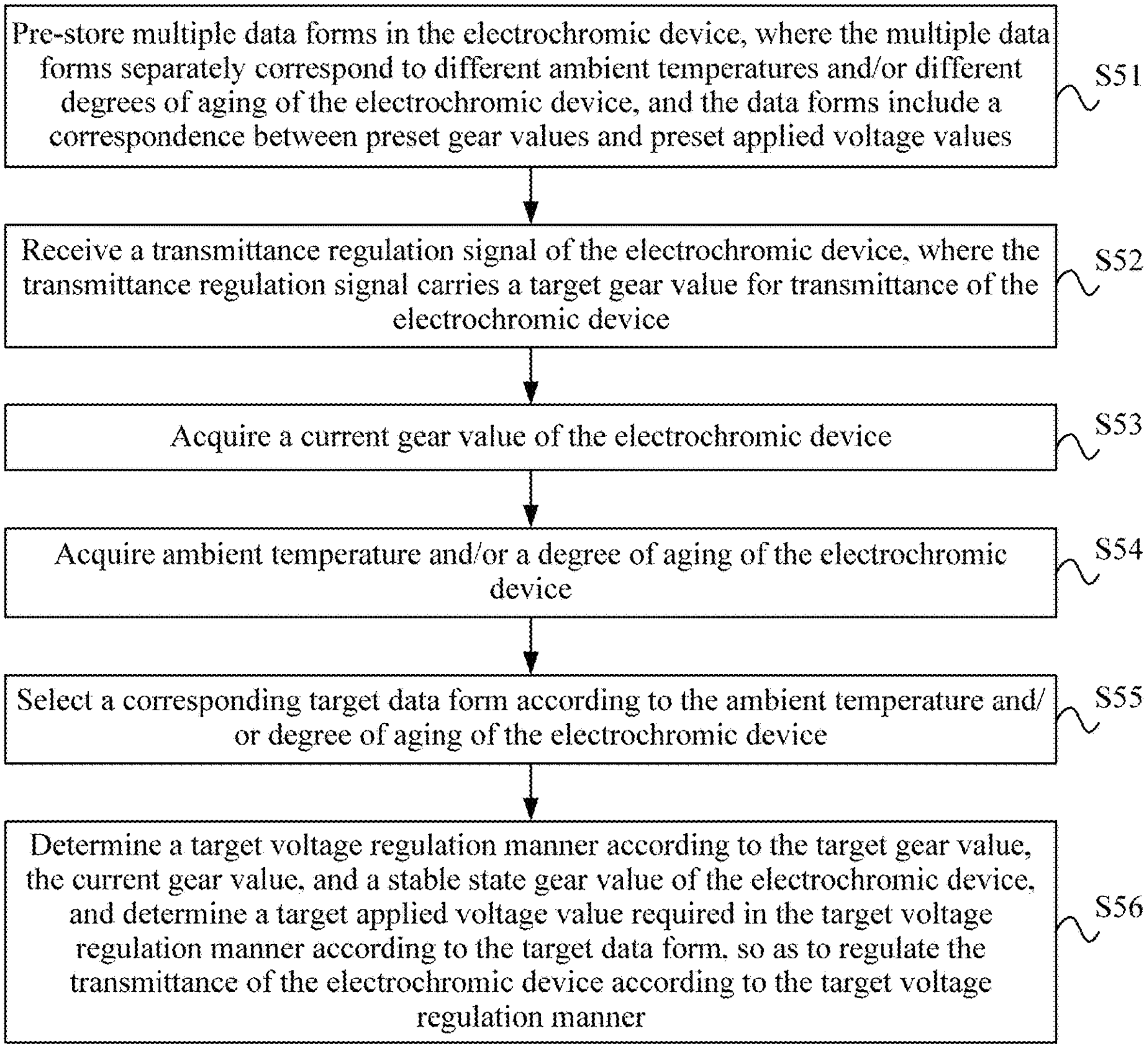
FIG. 5 is a flowchart of a regulation and control method for an electrochromic device according to another embodiment of the present application.

FIG. 5 is a flowchart of a regulation and control method for an electrochromic device according to another embodiment of the present application. The technical scheme in this embodiment is described based on the preceding technical schemes. Alternatively, the electrochromic device may better determine the target applied voltage value required to be provided corresponding to the target gear value in a manner of pre-storing a data form. In this embodiment, before the target voltage regulation manner is determined according to the target gear value, the current gear value, and the stable state gear value of the electrochromic device, the method further includes pre-storing a data form in the electrochromic device. The data form includes a correspondence between preset gear values and preset applied voltage values. Correspondingly, the step of determining the target voltage regulation manner according to the target gear value, the current gear value, and the stable state gear value of the electrochromic device further includes determining a corresponding target applied voltage value in the data form according to the target gear value. The step of pre-storing the data form in the electrochromic device includes pre-storing multiple data forms in the electrochromic device, and the multiple data forms respectively correspond to different ambient temperatures and/or different degrees of aging of the electrochromic device. Correspondingly, before the target voltage regulation manner is determined according to the target gear value, the current gear value, and the stable state gear value of the electrochromic device, the method further includes acquiring ambient temperature and/or a degree of aging of the electrochromic device, and selecting the corresponding target data form according to the acquired ambient temperature and/or the acquired degree of aging of the electrochromic device. Correspondingly, as shown in FIG. 5, the method may include the steps described below.

In S51, pre-storing multiple data forms in the electrochromic device, the multiple data forms respectively correspond to different ambient temperatures and/or different degrees of aging of the electrochromic device, and the data forms include a correspondence between a preset gear value and a preset applied voltage value.

The data forms may include the correspondence between the preset gear value and the preset applied voltage value so that after the target gear value is acquired, the target applied voltage value corresponding to the target gear value may be determined according to the correspondence, and then the transmittance of the electrochromic device may be regulated more visually with the target applied voltage value as the target according to the target voltage regulation manner. The target applied voltage value required for adjusting the transmittance of the electrochromic device to the target gear value may be different for different ambient temperatures and/or different degrees of aging of the electrochromic device. Therefore, different data forms require to be set for providing different correspondences so as to better determine the target applied voltage values required for the transmittance in multiple gears. Generally, as the temperature increases, the target applied voltage value corresponding to the same gear decreases, and as the degree of aging of the electrochromic device increases, the target applied voltage value corresponding to the same gear increases.

In S52, receiving a transmittance regulation signal of the electrochromic device, and the transmittance regulation signal carries a target gear value for transmittance of the electrochromic device.

In S53, acquiring a current gear value of the electrochromic device.

In S54, acquiring ambient temperature and/or a degree of aging of the electrochromic device.

The ambient temperature may be acquired by a configured temperature sensor or the like. With regard to the degree of aging of the electrochromic device, a self-detection may be performed on the electrochromic device, parameters such as the initial peak current and capacity are recorded in a low light environment at the normal temperature and measured once again after a period of time, and then a comparison is performed on the parameters. A change ratio of the parameter values may be used as the degree of aging of the electrochromic device. If the change ratio is less than a preset value (which may be 50%), a corresponding data form may be selected. If the change ratio is greater than the preset value, it may be determined that the electrochromic device has been damaged, and in this case, the damage condition may be fed back to the user to prompt the replacement of glass.

In S55, selecting a corresponding target data form according to the ambient temperature and/or the degree of aging of the electrochromic device.

A correspondence between the ambient temperature and/or degree of aging and the data form may also be pre-stored in the electrochromic device so that after the ambient temperature and/or degree of aging of the electrochromic device is acquired, the corresponding target data form may be selected to accurately determine the required target applied voltage value.

In S56, determining a target voltage regulation manner according to the target gear value, the current gear value, and a stable state gear value of the electrochromic device, and determining a target applied voltage value required in the target voltage regulation manner according to the target data form, so as to regulate the transmittance of the electrochromic device according to the target voltage regulation manner.

In the technical scheme provided in the embodiments of the present application, the data form is pre-stored in the electrochromic device, providing the convenience for the electrochromic device to determine the target applied voltage value required to be provided corresponding to the target gear value, and different data forms may be pre-stored according to the ambient temperatures and/or the degrees of aging of the electrochromic device, so as to provide the target applied voltage more suitable for a corresponding scenario, so that the regulation and control process is more accurate, and the user experience is improved.

Figure 6:
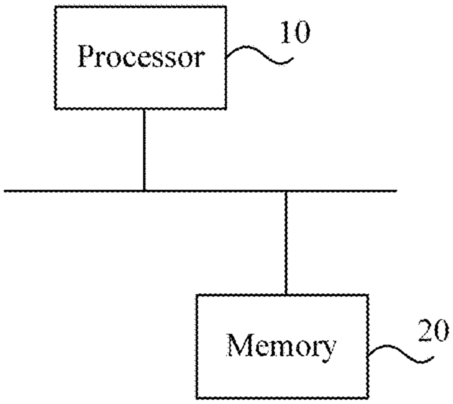
FIG. 6 is a structural diagram of an electronic device according to an embodiment of the present application.

FIG. 6 is a structural diagram of an electronic device according to an embodiment of the present application. As shown in FIG. 6, the present application further provides an electronic device. The electronic device includes a processor 10 and a memory 20, where the memory 20 is coupled to the processor 10, the memory 20 is configured to store a computer program code, and the computer program code includes computer instructions which, when executed by the processor 10, cause the electronic device to perform the regulation and control method for an electrochromic device in any of the preceding embodiments.

The present application further provides a computer-readable storage medium storing computer instructions which, when executed on an electronic device, cause the electronic device to perform the regulation and control method for an electrochromic device in any of the preceding embodiments.

The electronic device described in the present application may be designed and manufactured for the required purposes or may include known devices in a general-purpose computer. These devices have computer programs or application programs that are stored therein and selectively activated or reconfigured. Such computer programs may be stored in a storage medium readable by a device (for example, a computer) or may be stored in any type of medium suitable for storing electronic instructions and respectively coupled to a bus. The computer-readable medium includes, but is not limited to, any type of disk (including a floppy disk, a hard disk, an optical disc, a compact disc read-only memory (Compact Disc Read-Only Memory, CD-ROM), and a magneto-optical disc), a read-only memory (Read-Only Memory, ROM), a random-access memory (Random Access Memory, RAM), an erasable programmable read-only memory (Erasable Programmable Read-Only Memory, EPROM), an electrically erasable programmable read-only memory (Electrically Erasable Programmable Read-Only Memory, EEPROM), a flash memory, a magnetic card, or a light card. That is to say, the readable medium includes any medium that can be read by the device (for example, the computer) for storing or transmitting information. The computer-readable medium may be a non-transitory computer-readable medium.

What is claimed is:

1. A regulation and control method for an electrochromic device, comprising:

receiving a transmittance regulation signal of the electrochromic device, wherein the transmittance regulation signal carries a target gear value for transmittance of the electrochromic device, wherein the electrochromic device is configured with a plurality of gears and the plurality of gears is set in accordance with a changing order of the transmittance of the electrochromic device;

acquiring a current gear value of the electrochromic device; and determining, according to the target gear value, the current gear value, and a stable state gear value of the electrochromic device, a target voltage regulation manner to regulate the transmittance of the electrochromic device according to the target voltage regulation manner;

wherein a stable state of the electrochromic device is a state corresponding to an open circuit voltage of 0 V of the electrochromic device;

wherein the determining, according to the target gear value, the current gear value, and the stable state gear value of the electrochromic device, the target voltage regulation manner comprises:

determining a switching direction of the transmittance of the electrochromic device according to the target gear value, the current gear value, and the stable state gear value; and wherein the switching direction of the transmittance of the electrochromic device comprises: the current gear value is located on a side of the stable state gear value opposite to a side of the stable state gear value where the target gear value is located on, or, the current gear value is located on a side of the stable state gear value same as a side of the stable state gear value where the target gear value is located on.

2. The method of claim 1, wherein the switching direction of the transmittance of the electrochromic device comprises the current gear value is located on the side of the stable state gear value opposite to the side of the stable state gear value where the target gear value is located on;

wherein the determining, according to the target gear value, the current gear value, and the stable state gear value of the electrochromic device, the target voltage regulation manner further comprises:

determining that the target voltage regulation manner is a first voltage regulation manner, wherein the first voltage regulation manner comprises applying a target applied voltage value corresponding to the target gear value to the electrochromic device until a first preset cut-off condition is satisfied.

3. The method of claim 2, wherein before the applying the target applied voltage value corresponding to the target gear value to the electrochromic device until the first preset cut-off condition is satisfied, the first voltage regulation manner further comprises:

determining a first difference between the target gear value and the current gear value;

comparing the first difference with a first preset gear difference; and in response to the first difference being greater than the first preset gear difference, applying a maximum applied voltage value corresponding to the target gear value to the electrochromic device, monitoring the first difference in real time, and when the first difference monitored in real time changes to be less than or equal to the first preset gear difference, performing the applying the target applied voltage value to the electrochromic device until the first preset cut-off condition is satisfied.

4. The method of claim 1, wherein the switching direction of the transmittance of the electrochromic device comprises the current gear value is located on the side of the stable state gear value same as the side of the stable state gear value where the target gear value is located on;

wherein the determining the target voltage regulation manner according to the target gear value, the current gear value, and the stable state gear value of the electrochromic device further comprises:

determining a second difference between the target gear value and the stable state gear value and determining a third difference between the current gear value and the stable state gear value, comparing the second difference with the third difference, and determining the target voltage regulation manner according to a comparison result.

5. The method of claim 4, wherein the comparing the second difference with the third difference and determining the target voltage regulation manner according to the comparison result comprises:

in response to the second difference being less than the third difference, determining that the target voltage regulation manner is a second voltage regulation manner, wherein the second voltage regulation manner comprises short-circuiting the electrochromic device until a current open circuit voltage of the electrochromic device is within a range between a target applied voltage value corresponding to the target gear value and a stable state voltage value corresponding to the stable state gear value, and applying the target applied voltage value to the electrochromic device until a second preset cut-off condition is satisfied.

6. The method of claim 4, wherein the comparing the second difference with the third difference and determining the target voltage regulation manner according to the comparison result comprises:

in response to the second difference being greater than the third difference, determining that the target voltage regulation manner is a third voltage regulation manner, wherein the third voltage regulation manner comprises applying a target applied voltage value corresponding to the target gear value to the electrochromic device until a third preset cut-off condition is satisfied.

7. The method of claim 6, wherein before the applying the target applied voltage value corresponding to the target gear value to the electrochromic device until the third preset cut-off condition is satisfied, the third voltage regulation manner further comprises:

determining a fourth difference between the target gear value and the current gear value;

comparing the fourth difference with a second preset gear difference; and in response to the fourth difference being greater than the second preset gear difference, applying a maximum applied voltage value corresponding to the target gear value to the electrochromic device, monitoring the fourth difference in real time, and when the fourth difference monitored in real time changes to be less than or equal to the second preset gear difference, performing the applying the target applied voltage value to the electrochromic device until the third preset cut-off condition is satisfied.

8. The method of claim 1, wherein after the determining, according to the target gear value, the current gear value, and the stable state gear value of the electrochromic device, the target voltage regulation manner, the method further comprises:

monitoring the current gear value in real time, determining an offset value of the current gear value relative to the target gear value, and in response to the offset value being greater than a third preset gear difference, applying a target applied voltage value corresponding to the target gear value to the electrochromic device until a fourth preset cut-off condition is satisfied.

9. The method of claim 1, wherein before the determining, according to the target gear value, the current gear value, and the stable state gear value of the electrochromic device, the target voltage regulation manner, the method further comprises:

pre-storing a data form in the electrochromic device, wherein the data form comprises a correspondence between a preset gear value and a preset applied voltage value;

wherein the determining, according to the target gear value, the current gear value, and the stable state gear value of the electrochromic device, the target voltage regulation manner further comprises:

determining a target applied voltage value in the data form according to the target gear value.

10. The method of claim 9, wherein the pre-storing the data form in the electrochromic device comprises:

pre-storing a plurality of data forms in the electrochromic device, wherein the plurality of data forms respectively correspond to at least one of different ambient temperatures and different degrees of aging of the electrochromic device;

wherein before the determining, according to the target gear value, the current gear value, and the stable state gear value of the electrochromic device, the target voltage regulation manner, the method further comprises:

acquiring at least one of an ambient temperature and a degree of aging of the electrochromic device; and selecting a target data form according to the at least one of the acquired ambient temperature and the acquired degree of aging of the electrochromic device.

11. An electronic device, comprising: a processor and a memory, wherein the memory is coupled to the processor, and the memory is configured to store a computer program code, wherein the computer program code comprises computer instructions which, when executed by the processor, cause the electronic device to perform the following:

receiving a transmittance regulation signal of the electrochromic device, wherein the transmittance regulation signal carries a target gear value for transmittance of the electrochromic device, wherein the electrochromic device is configured with a plurality of gears and the plurality of gears is set in accordance with a changing order of the transmittance of the electrochromic device;

acquiring a current gear value of the electrochromic device; and determining, according to the target gear value, the current gear value, and a stable state gear value of the electrochromic device, a target voltage regulation manner to regulate the transmittance of the electrochromic device according to the target voltage regulation manner;

wherein a stable state of the electrochromic device is a state corresponding to an open circuit voltage of 0 V of the electrochromic device;

wherein the determining, according to the target gear value, the current gear value, and the stable state gear value of the electrochromic device, the target voltage regulation manner comprises:

determining a switching direction of the transmittance of the electrochromic device according to the target gear value, the current gear value, and the stable state gear value; and wherein the switching direction of the transmittance of the electrochromic device comprises: the current gear value is located on a side of the stable state gear value opposite to a side of the stable state gear value where the target gear value is located on, or, the current gear value is located on a side of the stable state gear value same as a side of the stable state gear value where the target gear value is located on.

12. The electronic device of claim 11, wherein the switching direction of the transmittance of the electrochromic device comprises the current gear value is located on the side of the stable state gear value opposite to the side of the stable state gear value where the target gear value is located on;

wherein the electronic device is caused to further perform the determining, according to the target gear value, the current gear value, and the stable state gear value of the electrochromic device, the target voltage regulation manner by:

determining that the target voltage regulation manner is a first voltage regulation manner, wherein the first voltage regulation manner comprises applying a target applied voltage value corresponding to the target gear value to the electrochromic device until a first preset cut-off condition is satisfied.

13. The electronic device of claim 12, wherein before the applying the target applied voltage value corresponding to the target gear value to the electrochromic device until the first preset cut-off condition is satisfied, the first voltage regulation manner further comprises:

determining a first difference between the target gear value and the current gear value;

comparing the first difference with a first preset gear difference; and in response to the first difference being greater than the first preset gear difference, applying a maximum applied voltage value corresponding to the target gear value to the electrochromic device, monitoring the first difference in real time, and when the first difference monitored in real time changes to be less than or equal to the first preset gear difference, performing the applying the target applied voltage value to the electrochromic device until the first preset cut-off condition is satisfied.

14. The electronic device of claim 11, wherein the switching direction of the transmittance of the electrochromic device comprises the current gear value is located on the side of the stable state gear value same as the side of the stable state gear value where the target gear value is located on;

wherein the electronic device is caused to further perform the determining the target voltage regulation manner according to the target gear value, the current gear value, and the stable state gear value of the electrochromic device by:

determining a second difference between the target gear value and the stable state gear value and determining a third difference between the current gear value and the stable state gear value, comparing the second difference with the third difference, and determining the target voltage regulation manner according to a comparison result.

15. The electronic device of claim 14, wherein the electronic device is caused to perform the comparing the second difference with the third difference and determining the target voltage regulation manner according to the comparison result by:

in response to the second difference being less than the third difference, determining that the target voltage regulation manner is a second voltage regulation manner, wherein the second voltage regulation manner comprises short-circuiting the electrochromic device until a current open circuit voltage of the electrochromic device is within a range between a target applied voltage value corresponding to the target gear value and a stable state voltage value corresponding to the stable state gear value, and applying the target applied voltage value to the electrochromic device until a second preset cut-off condition is satisfied.

16. The electronic device of claim 14, wherein the electronic device is caused to perform the comparing the second difference with the third difference and determining the target voltage regulation manner according to the comparison result by:

in response to the second difference being greater than the third difference, determining that the target voltage regulation manner is a third voltage regulation manner, wherein the third voltage regulation manner comprises applying a target applied voltage value corresponding to the target gear value to the electrochromic device until a third preset cut-off condition is satisfied.

17. The electronic device of claim 16, wherein before the applying the target applied voltage value corresponding to the target gear value to the electrochromic device until the third preset cut-off condition is satisfied, the third voltage regulation manner further comprises:

determining a fourth difference between the target gear value and the current gear value;

comparing the fourth difference with a second preset gear difference; and in response to the fourth difference being greater than the second preset gear difference, applying a maximum applied voltage value corresponding to the target gear value to the electrochromic device, monitoring the fourth difference in real time, and when the fourth difference monitored in real time changes to be less than or equal to the second preset gear difference, performing the applying the target applied voltage value to the electrochromic device until the third preset cut-off condition is satisfied.

18. The electronic device of claim 11, wherein after the determining, according to the target gear value, the current gear value, and the stable state gear value of the electrochromic device, the target voltage regulation manner, the electronic device is caused to further perform:

monitoring the current gear value in real time, determining an offset value of the current gear value relative to the target gear value, and in response to the offset value being greater than a third preset gear difference, applying a target applied voltage value corresponding to the target gear value to the electrochromic device until a fourth preset cut-off condition is satisfied.

19. The electronic device of claim 11, wherein before the determining, according to the target gear value, the current gear value, and the stable state gear value of the electrochromic device, the target voltage regulation manner, the electronic device is caused to further perform:

pre-storing a data form in the electrochromic device, wherein the data form comprises a correspondence between a preset gear value and a preset applied voltage value;

wherein the electronic device is caused to perform the determining, according to the target gear value, the current gear value, and the stable state gear value of the electrochromic device, the target voltage regulation manner further by:

determining a target applied voltage value in the data form according to the target gear value.

20. The electronic device of claim 19, wherein the electronic device is caused to perform the pre-storing the data form in the electrochromic device by:

pre-storing a plurality of data forms in the electrochromic device, wherein the plurality of data forms respectively correspond to at least one of different ambient temperatures and different degrees of aging of the electrochromic device;

wherein before the determining, according to the target gear value, the current gear value, and the stable state gear value of the electrochromic device, the target voltage regulation manner, the method further comprises:

acquiring at least one of an ambient temperature and a degree of aging of the electrochromic device; and selecting a target data form according to the at least one of the acquired ambient temperature and the acquired degree of aging of the electrochromic device.

* * * * *